June 16, 1959    WOLF-DIETER BENSINGER ET AL    2,890,598
CONNECTING ROD
Filed April 11, 1955                              2 Sheets-Sheet 1
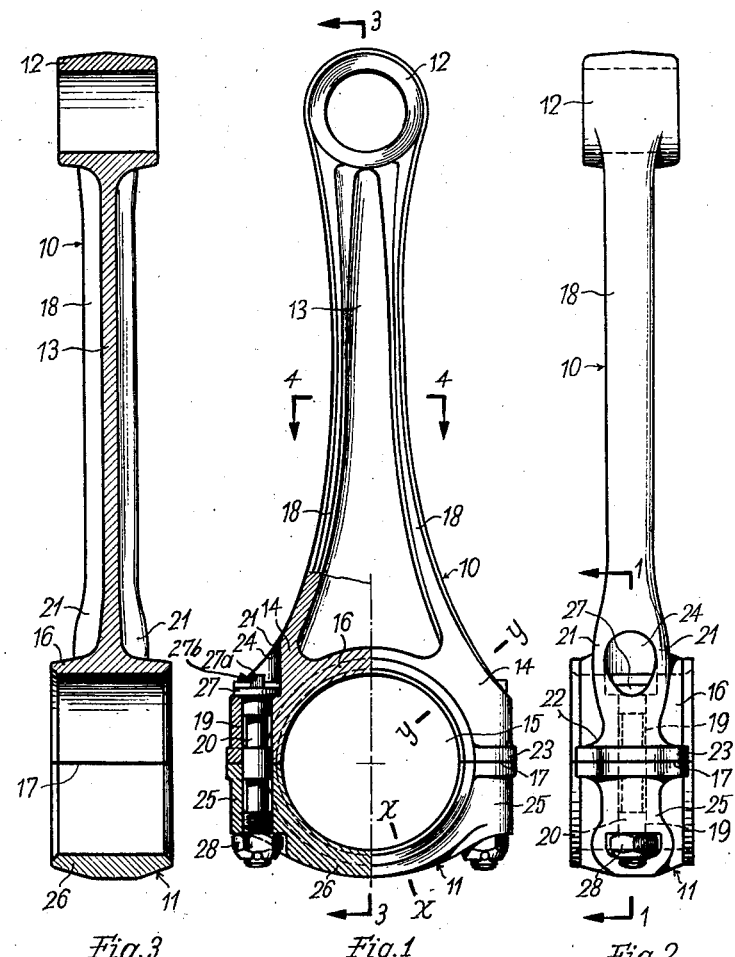
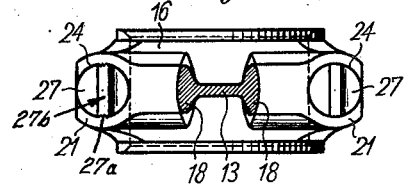
INVENTORS
WOLF-DIETER BENSINGER
AND MARTIN FRITZ
BY Dicke and Craig
ATTORNEYS.

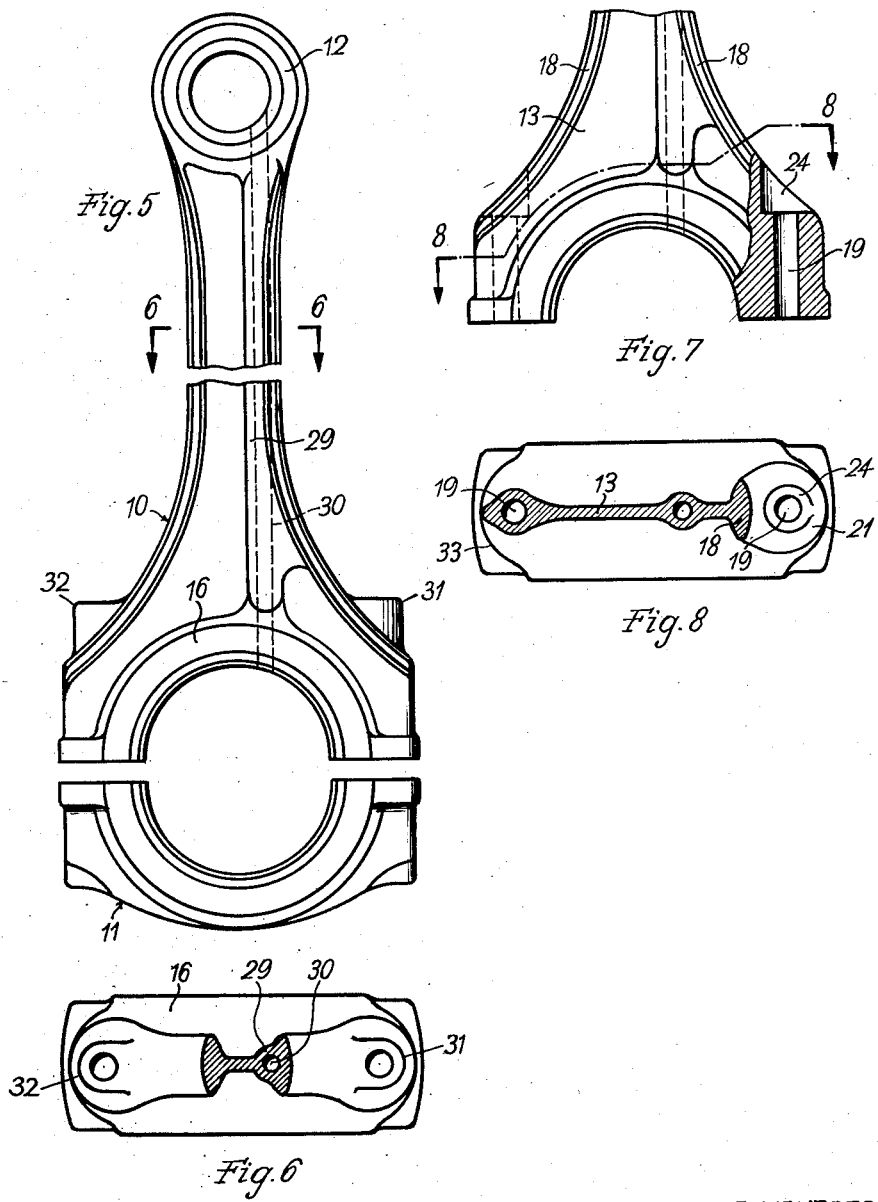

United States Patent Office 2,890,598
Patented June 16, 1959

2,890,598

CONNECTING ROD

Wolf-Dieter Bensinger, Stuttgart-Unterturkheim, and Martin Fritz, Oberurbach, near Schorndorf, Germany, assignors to Daimler-Benz Aktiengesellschaft, Stuttgart-Unterturkheim, Germany Application April 11, 1955, Serial No. 500,606

Claims priority, application Germany April 17, 1954

9 Claims. (Cl. 74—579)

This invention relates to a connecting rod for engines and more particularly to a connecting rod adapted for use in highspeed power engines.

An important object of the present invention is the provision of a connecting rod that is light and compact in structure and adapted to offer least possible air resistance so that it is especially suitable for use at very high speeds of revolution.

Another object of the present invention is to provide a connecting rod of such construction that the forces occurring at the connecting-rod head and more particularly at the connecting-rod bottom or big end are in an especially advantageous manner transferred from the connecting-rod head to the connecting-rod blade.

A further object of the present invention is to provide a connecting rod in which the bearing cap of the connecting-rod head is relieved from prejudicial stressing which is attained especially thereby that the forked arms of the connecting-rod head which form a rigid unitary structure with the connecting-rod blade are formed with a cross section of substantial height on either side of the connecting-rod eye, whilst the bearing cap is formed with a cross section which is substantially lower in height than that of said fork arms. In conjunction with this the connecting-rod head may be made in one piece. However, the invention is preferably applicable to split connecting-rod heads so that the flexibility of the bearing cap becomes already effective in the connection thereof with the remainder of the connecting-rod head when the connecting rod is fitted to the engine, in that a good running fit and freedom from play of the bearing cap on the crank pin is ensured.

A still further object of the present invention is to provide a simple reliable connection of the components of the connecting rod with one another as well as such an arrangement of the connecting elements that they interfere as little as possible with the streamline design of the connecting rod, yet at the same time weaken the strength of the connecting rod as little as possible.

Further objects, features and advantages of the present invention will become apparent from the following description taken in connection with the accompanying drawings and specifically pointed out in the appended claims.

Several embodiments of the invention, as applied to a connecting rod with a split connecting-rod head of an automotive highspeed internal combustion engine, are illustrated by way of example, in the accompanying drawings, in which:

Fig. 1 is a front elevational view of one connecting rod constructed in accordance with the present invention, the left half of the connecting-rod head being shown in a sectional view taken along line 1—1 of Fig. 2, Fig. 2 is a side elevational view of the connecting rod shown in Fig. 1, Fig. 3 is a sectional view taken along line 3—3 of Fig. 1, Fig. 4 is a sectional view taken along line 4—4 of Fig. 1, Fig. 5 is a front elevational view showing a modification of the connecting rod, Fig. 6 is a sectional view taken along line 6—6 of Fig. 5, Fig. 7 shows a modification similar to that shown in Fig. 5, and Fig. 8 is a sectional view taken along line 8—8 of Fig. 7.

In the two embodiments shown in the drawing the connecting rod is made in two parts, namely, a main part 10 and a bearing cap 11. The main part 10 comprises a closed top-end eye 12 which constitutes the wrist-pin end thereof, a connecting-rod head member 16 which, together with the bearing cap 11, forms the connecting-rod big end, and a connecting-rod blade member 13 interconnecting said wrist-pin end 12 with said connecting-rod head member 16. The connecting-rod blade member 13, as is clearly shown in Fig. 4, has an I-shaped cross section whose center web is disposed perpendicularly to the axis of the crank pin bore of the connecting-rod big end or of the connecting-rod eye 12. The connecting-rod blade 13 flares in streamline fairing into the lateral fork arms 14 of the forked connecting-rod head member 16 which forms a part and surrounds the bore 15 for accommodation of the crank pin so that said fork arms are essentially equal in radial height from the connecting-rod blade member 13 to the joint 17.

As is specifically shown in Fig. 2, the ribs 18 bounding the connecting-rod blade at either side flare into the fork arms of the connecting-rod head 16 and are bulged out at 21 to form eyes about the recesses 24 for the heads 27 of the bolts 20 and fair with a curve 22 into the wide flanges 23 for connecting the forkhead with the bearing cap 11. Thus is imparted such a great rigidity to the forkhead above the joint 17 that also at extreme tensile stresses it withstands every appreciable deformation.

In contradistinction thereto the bearing cap 11 is made relatively rigid only in the lateral portions 23 within the range of the connecting bolts 20, whereas the center portion 26 is but small in radial height, for example, such that its cross-sectional height $x$—$x$ amounts only to about one-half or one-third of the cross-sectional height $y$—$y$ of the forkhead.

The relatively small height of the bearing cap cross section in the area between the connecting bolts 20 assures sufficient flexibility in the region of said bearing cap so as to yield somewhat when the bolts 20 are tightened or other loading is applied to the cap in operation. Such a relatively flexible bearing cap adapts itself very readily to the contour of the crank pin, a feature which results in quiet operation of the bearing and contributes effectively in preventing the bearing from being pounded out. The fork head 16, on the other hand, is constructed of relatively heavy cross sections and as a result can yield little under the forces applied thereto but will transmit all forces positively and reliably to the crank.

The connecting bolts 20 are provided with fine serrations 27a on opposite segments of the raised central portion generally designated by reference numeral 27b of their head 27 so that said serrations, when the nuts 28 are tightened, are forced into the material, but only fractions of a millimeter, for example. Owing to the fineness of the serrations a detrimental notch effect on the connecting-rod head can be avoided by the retaining means of the bolts 20.

The form of the invention according to Figs. 5 and 6 differs from that of Figs. 1 through 3 only essentially therein that the connecting-rod blade has a reinforcing rib 29 formed essentially by reinforcing one of said lateral ribs in the direction towards the connecting rod blade center of the lateral ribs, with a bore 30 extended therethrough which establishes communication between the bearing surface of the upper connecting-rod head 12 and the bearing surface of the forkhead 16 for the crank pin and serves for supplying lubricating oil to the wrist pin of the piston.

The lugs 31 and 32 preferably serve only for drilling the holes 19 and are removed subsequently to the drilling so that the connecting rod will have the streamline shape illustrated in Figs. 7 and 8. The web portion 13 flares essentially into the lateral surface 33 of the connecting-rod head, whereas the ribs or flange portions 18, which entirely or partially surround the bores 19 and recesses 24 respectively, terminate at the top side of the forkhead.

The connecting rod is most advantageously made as a forging of high-grade steel in which the bore for the wrist pin is machined from the solid, whilst the bore for the crank pin is advantageously made by boring out a hole already provided for in the forging and subsequent severing the bearing cap or top section of the connecting-rod big end therefrom.

It will be obvious that various modifications may be made in the embodiments above described without in any way departing from the spirit of the invention as defined in the appended claims.

What we claim is:

1. A connecting rod comprising a connecting-rod blade member with lateral surfaces, a connecting-rod big end disposed on one side thereof, a top-end disposed at the other end thereof, said connecting-rod big end being provided with a crank pin bore and being subdivided along a plane perpendicular to the axis of said connecting-rod blade member into a cap member and a connecting-rod head member, the lateral surfaces of said connecting-rod blade member as seen in the axial direction of said bore passing over and being extended into the lateral surfaces of said connecting-rod head member so as to fair at the most with a gentle break, said connecting-rod big end being provided with holes at both sides of said crank-pin bore extending through said connecting-rod head member and said cap member in a direction parallel to the axis of said connecting-rod blade member, connecting-rod bolts disposed in said holes each having a head at one end thereof to prevent axial movement of said bolt by said bolt head in the direction towards the other end of said bolt, and a nut at said other end to prevent axial movement thereof in the opposite direction towards the bolt head end of said bolt, said cap member in a central cross section thereof being smaller in radial height than the portions of said connecting-rod head member located between said connecting-rod blade and said cap member and disposed oppositely thereto, and the height of said cap member decreasing from the sides toward the center thereof.

2. A connecting rod according to claim 1, wherein said cap member has a radial height which is from one half to one third that of said portions of said connecting-rod head member located oppositely thereto.

3. A connecting rod according to claim 1, having recesses at the ends of said holes for receiving the heads of said bolts such that said heads protrude at the most but slightly over the lateral surfaces of said connecting-rod blade which fair into the lateral surface of said connecting-rod head member.

4. A connecting rod according to claim 3, said connecting-rod blade having an I section with a center web member disposed perpendicular to the axis of said connecting-rod big end, and said lateral surfaces of said connecting-rod blade being formed by the flange portions of said I section, and said flange portions being widened within the range of said recesses so as to surround them to form eyes for said bolt heads.

5. A connecting rod according to claim 4, wherein said main part of said connecting rod has a connecting flange which forms the joint for said cap member, and said flange portions which surround said recesses being extended to said connecting flange and fair thereinto.

6. A connecting rod according to claim 3, wherein said bolt heads over only two oppositely disposed portions of their perimeter have essentially the same diameter as said recesses and are provided thereon with longitudinal serrations whose outside diameter is slightly larger than the diameter of said recesses, such that when said bolts are tightened said serrations are forced into the walls of said recesses to thereby secure said bolts against turning.

7. A connecting rod comprising a connecting-rod head, a connecting-rod blade with an I-shaped section having a web portion extending in a plane perpendicular to said connecting-rod head and flange portions which as seen in the direction of the axis of said connecting-rod head bound said connecting-rod blade laterally, said connecting-rod head having a bore therein, said web portion being extended both into said connecting-rod head and as seen in the direction of the axis of said connecting-rod head into the lateral surfaces of the latter, and said flanges of said connecting-rod blade being likewise extended into the lateral surfaces of said connecting-rod head.

8. A connecting rod according to claim 7, wherein said connecting-rod big end is divided along a plane extending perpendicular to the axis of said connecting-rod blade so that both a main part and a cap member thereof is formed, and further comprising fastening bolts having bolts heads on either side of the axis of said connecting-rod blade for connecting said cap member to said main part, holes for receiving said fastening bolts in said two parts, and wherein the wall thickness of said main part is so dimensioned within the range of said bores that said latter are extended therethrough as enclosed bores.

9. A connecting rod according to claim 7 including, a rib-like enlargement of said web portion extending in longitudinal direction of said connecting-rod blade, and a bore suitably adapted to serve as an oil line extending longitudinally through said rib-like enlargement.

References Cited in the file of this patent

UNITED STATES PATENTS

| | | |
|---|---|---|
| 1,803,317 | Brown | May 5, 1931 |
| 1,819,784 | McKone | Aug. 18, 1931 |
| 2,287,735 | Halford | June 23, 1942 |

FOREIGN PATENTS

| | | |
|---|---|---|
| 62,319 | Denmark | June 6, 1944 |
| 364,217 | Italy | Oct. 25, 1938 |
| 383,865 | Great Britain | Nov. 24, 1932 |
| 464,724 | Great Britain | Apr. 23, 1937 |
| 531,909 | Great Britain | Jan. 14, 1941 |
| 781,953 | Great Britain | Aug. 28, 1957 |
| 881,327 | France | Jan. 22, 1943 |